April 26, 1955     B. V. THOMPSON ET AL     2,707,271
ELECTRICAL COUPLING APPARATUS
Filed Jan. 15, 1947     3 Sheets-Sheet 1

INVENTORS
Ben V. Thompson
BY Emil W. Deiss
ATTORNEY

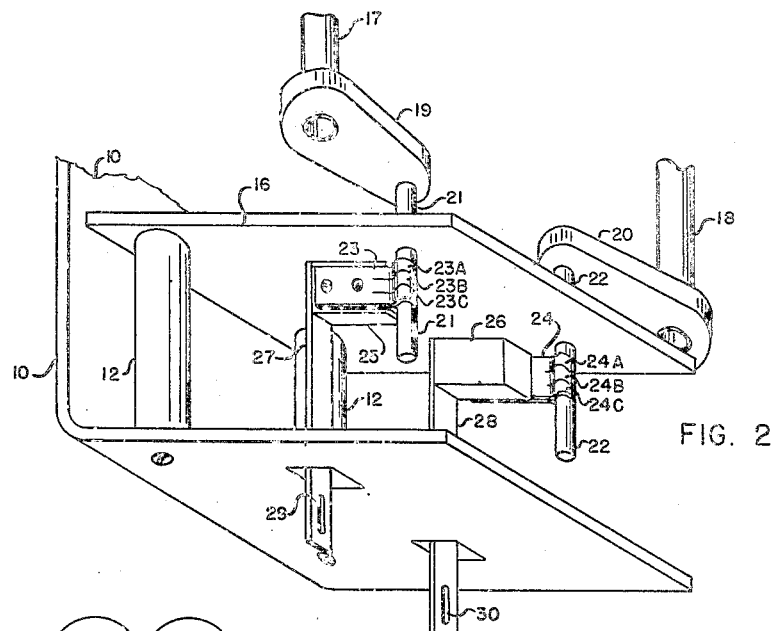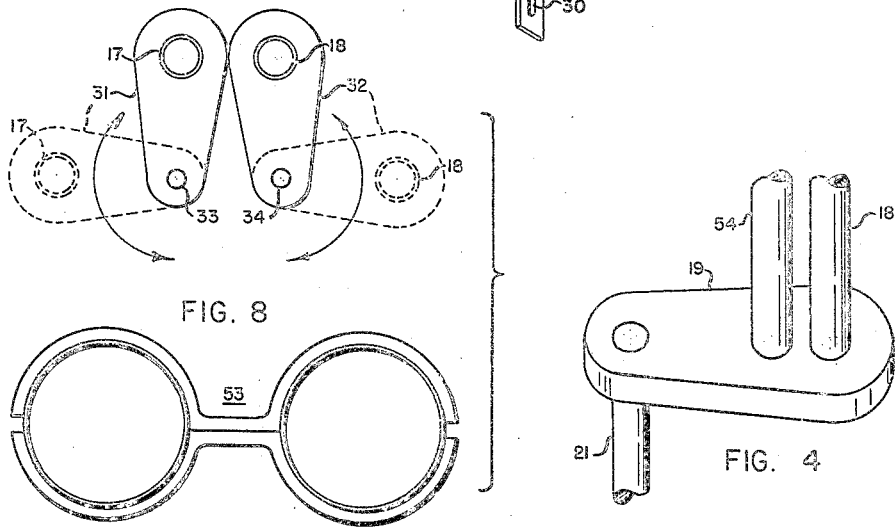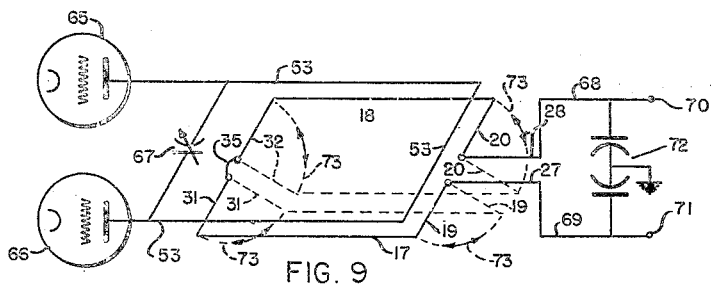

April 26, 1955        B. V. THOMPSON ET AL         2,707,271
ELECTRICAL COUPLING APPARATUS
Filed Jan. 15, 1947                          3 Sheets-Sheet 3
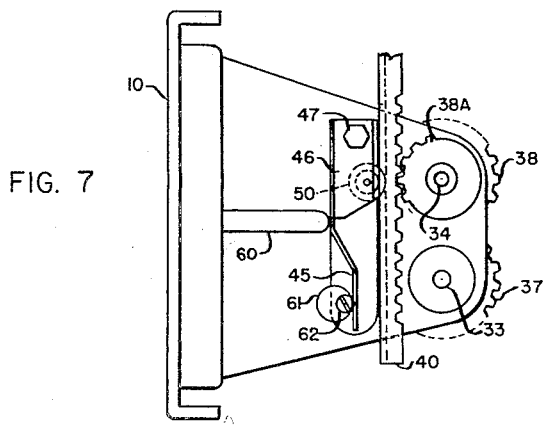
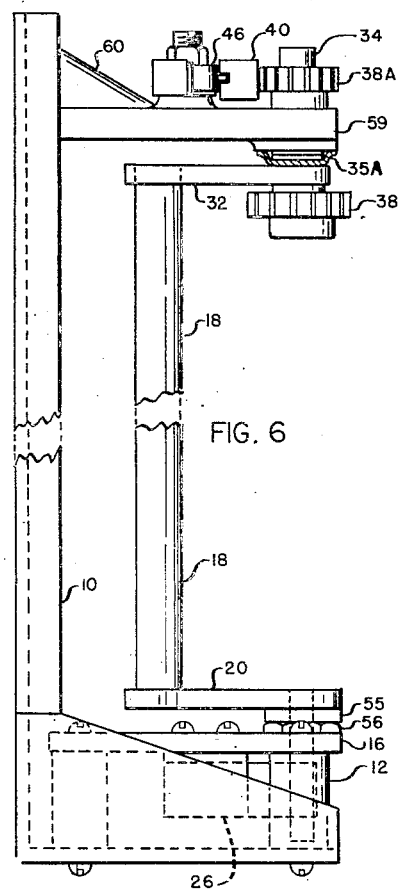
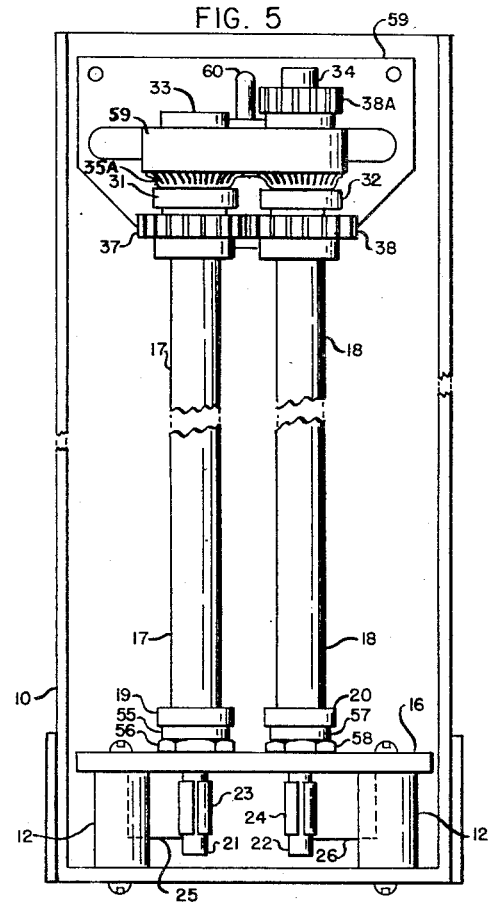
INVENTORS
Ben V. Thompson
BY Emil W. Deiss
ATTORNEY

United States Patent Office 2,707,271
Patented Apr. 26, 1955

2,707,271

ELECTRICAL COUPLING APPARATUS

Ben V. Thompson, Upper Montclair, and Emil W. Deiss, Paramus, N. J., assignors to International Telephone and Telegraph Corporation, a corporation of Maryland Application January 15, 1947, Serial No. 722,128

13 Claims. (Cl. 336—20)

This invention relates to electronic coupling and more particularly to electronic coupling between two transmission line sections such as the plate tank and coupling loop associated with a frequency modulation transmitter.

An object of this invention is to provide a device for adjusting the coupling between two transmission line sections over a wide coupling range; and one which may have one position of substantially zero coupling.

Another object of this invention is to provide a device for adjusting the coupling between two transmission line sections wherein the spacing between the conductors of one section is varied simultaneously with their distance from the second section.

A feature of this invention relates to the mechanical control device wherein that device is constructed in one single compact unit which is arranged to be placed into the transmitter or other apparatus with which it is associated.

A further feature of this invention relates to the movement of the conductors of one section relative to each other and the relative movement of those conductors with respect to the other section whose conductors are stationary wherein the conductors of the first section are simultaneously moved closer together and further from the other or stationary section.

Other objects, features, and advantages not particularly enumerated will be apparent to those skilled in the art on considering the following descriptions taken in connection with the accompanying drawings; in which:

Fig. 2 is an isometric view of the remaining portion of the device shown in Fig. 1;

Fig. 4 is an isometric view of a portion of another embodiment;

Fig. 5 is a front elevational view of another embodiment of the invention;

Fig. 6 is a side elevational view of the embodiment shown in Fig. 5;

Fig. 7 is a top view of the embodiment shown in Figs. 5 and 6;

Fig. 8 is a top view of a portion of the embodiment shown in Figs. 1 and 2 demonstrating more clearly the cooperation of certain parts; and Fig. 9 is a circuit diagram showing the principles of the invention.

Similar numerals refer to similar parts throughout the several views.

Figures 1, 3:
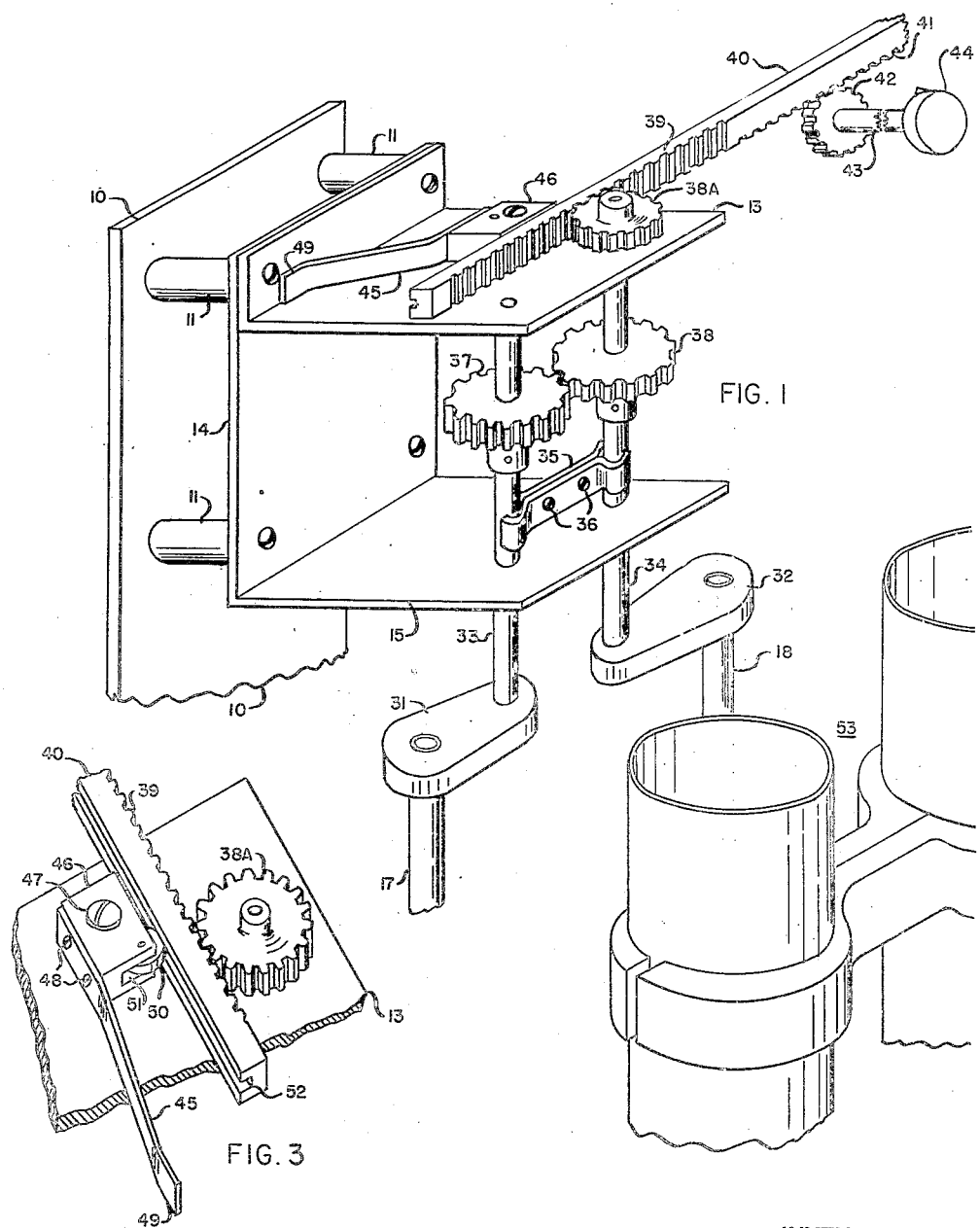
Fig. 1 is an isometric view of a portion of a device showing the inventive concept.
Fig. 3 is an isometric view of a portion of the embodiment shown in Figs. 1 and 2.

Referring more particularly to Figs. 1 and 2, the mechanical control arrangement is fixedly mounted to plate 10 by some suitable means such as, for example, screws or bolts and is insulated therefrom by insulators 11 (Fig. 1) and insulators 12 (Fig. 2). Insulators 11 position plates 13, 14 and 15 through which the above-referred to screws or bolts pass. By similar fastening means, insulators 12 support plate 16. It has been found that, as a mechanical expedient, plates 13, 14, 15 and 16 should be made of any suitable insulating material in order to eliminate the necessity of insulating the high frequency currents from those members as would be required if these plates were made of a metallic conducting material.

The transmission line radio frequency conductors 17 and 18 are affixed at one of their ends to one of the ends of the conducting arms 19 and 20 respectively (Fig. 2).

Conducting arms 19 and 20 are affixed near their other end to shafts 21 and 22, respectively, suitably mounted in plate 16 and extending therethrough opposite arms 19 and 20 a sufficient distance to permit the connection of current carrying elements thereto as is subsequently described. Arms 19 and 20 are rotatable with shafts 21 and 22, respectively, and are accordingly secured to those shafts by any suitable means such as pinning so that the rotation of the shaft causes a corresponding rotation of the radio frequency conductor.

Wiper spring contacts 23 and 24 respectively serve to convey radio frequency current to or from shafts 21 and 22 in accordance with the operation of the radio frequency circuit. These contacts are stationary with respect to the rotatable shaft to which they are connected. A good current carrying connection between the contact and shaft is assured because of the pressure of the contact against the shaft which pressure is accentuated by forming the wiper contacts as a series of resilient fingers shown as 23A–C and 24A–C. Wiper contacts 23 and 24 are connected to connecting blocks 25 and 26 respectively by any suitable connecting means such as the screws here shown. Connecting blocks 25 and 26 are in a like manner, fastened to the terminal strips 27 and 28 respectively which extend through plate 10 as shown and contain the terminal connecting slots 29 and 30.

The other ends of the radio frequency conductors 17 and 18 are affixed respectively to one end of the conducting arms 31 and 32. Arms 31 and 32 are fixedly connected near their other end to shafts 33 and 34 respectively. Arms 31 and 32 are similar to arms 19 and 20, are connected to the shafts and conductors in the same manner and are mounted in the same angular position. Shafts 33 and 34 extend through plates 13 and 15 and are rotatable relative to those plates and mounted thereto by a suitable bearing which in most cases, because of the low speed of the shafts, is of the conventional journal type.

Shorting bar 35 clamped to shafts 33 and 34 is the conventional type transmission line shorting bar and the clamped position of that bar along the shafts 33 and 34 is determined by the electrical considerations involved. Screws 36 are provided to allow adjustment of the clamping force exerted by that bar.

Meshed spur gears 37 and 38 fixedly pinned to shafts 33 and 34 respectively provide for opposite and synchronous rotation of the shafts upon the rotation of one of them. Spur gear 38A is fixedly pinned to shaft 34 and meshes with teeth 39 of sliding bar 40 which also has teeth 41 in meshed engagement with spur gear 42 carried by shaft 43 on which is mounted a manual control 44. Teeth 39 of bar 40 are continuously urged into engagement with gear 38A by the spring 45 associated with pivotally mounted block 46.

The construction and operation of this spring urged mechanism is fully understood by reference to Fig. 3. Block 46 is pivotally mounted on plate 13 by screw bolt 47. Spring 45 is attached to block 46 by screws 48 and portion 49 of that spring by its pressure against 48 and portion 49 of that spring by its pressure against plate 13 (Fig. 1) prevents the clockwise rotation of block 46 beyond a certain predetermined limit. Wheel 50 in slot 51 of block 46 is pinned to that block and is of such thickness that its outer periphery rides with a minimum of friction in groove 52 of sliding bar 40. Thus the pressure exerted by spring 45 on block 46 is transferred by wheel 50 to sliding bar 40 and thereby provides for continuous and uniform meshed engagement between teeth 39 of bar 40 and spur gear 38A.

Plate tank circuit 53 (Fig. 1) is any conventional type plate tank circuit such as, for example, that associated with the plates of the transmitter tubes of a frequency modulation type transmitter. The particular plate tank circuit employed does not constitute part of this invention since the principles of this invention are equally applicable to any type plate tank circuit. Radio frequency conductors 17 and 18 carried by arms 19, 31 and 20, 32 respectively, are mounted in a certain spaced relation relative to tank circuit 53. This positioning of conductors 17 and 18 relative to tank circuit 53 is determined, among other things, by the coupling desired between circuit 53 and the transmission line section comprising conductors 17 and 18.

If control 44 is rotated counterclockwise, shaft 43 and gear 42 are likewise rotated and sliding bar 40 is driven to the left rotating gear 38A pinned to shaft 34 in a counterclockwise direction. The rotation of arm 32 is therefore counterclockwise and conductor 18 carried by it is moved outward from plate tank 53 and closer to conductor 17. The counterclockwise rotation of gear 38 causes gear 37 meshed therewith and pinned to shaft 33 to be rotated clockwise. Thus, arm 31 is rotated clockwise moving conductor 17 outward from plate tank 53 and closer to conductor 18. The less the distance between conductors 17 and 18 the less the characteristic impedance of the transmission line section they comprise. The coefficient of coupling also varies in accordance with the distance of conductors 17 and 18 from the tank circuit 53. It is now seen that the counterclockwise rotation of control 44 combines these two effects by moving conductors 17 and 18 through an arc of a circle and that these two effects each contribute to a reduction of the coupling. Clockwise rotation of control 44 has the opposite effect, namely, that of increasing the coupling. By calibrating a dial associated with control 44 to indicate the various desired coupling values or impedance values, the coupling between the circuits can be made to conform to any desired value by simply rotating control 44 until it is set at the desired value.

This affords quick and accurate setting or determination of the coupling by the use of a unitary control and has the advantage of utilizing a simple mechanical construction which effects the coupling adjustment by combining the impedance change effected by movement of the conductors relative to each other and the change in the coefficient of coupling produced by movement of the conductors relative to the tank circuit.

Fig. 4 shows a modification of the embodiment shown in Figs. 1 and 2 in that the arms are each adapted to carry two conductors instead of the one as shown in those figures. Arm 19 is shown associated with conductor 54 positioned parallel to conductor 18. While only arm 19 is shown carrying two conductors it is understood that this is to show that each of the arms may be adapted to carry a plurality of radio frequency conductors and that this does not require alteration or change of any of the remaining parts of the device.

It is noted that the use of a plurality of conductors affixed to each arm or in other words the use of a plurality of conductors on each side of the loop reduces the decoupling capacity as well as the impedance of the loop.

Figs. 5, 6 and 7 show an embodiment of the invention which effects the coupling between two transmission line sections according to the principles employed by the embodiment shown in Figs. 1, 2, and 3. The operation of the two embodiments is the same and it is only necessary herein to describe the differing structure of the embodiment shown in Figs. 5, 6 and 7.

Figs. 5 and 6 show the change effected in the arrangement of the structure. Shafts 21 and 22 are mounted on plate by any suitable means such as a journal bearing. Plate 16 is secured to plate 10 by insulators 12. Conductors 17 and 18 are fastened to arms 19 and 20 respectively which are fixedly mounted on shafts 21 and 22 and secured thereon by washer 55, nut 56 and washer 57 and nut 58 respectively. The driving gears are positioned in spaced relation with shafts 21 and 22 by mounting the shafts 33 and 34 carrying the driving gears on plate 59 secured to plate 10. Bracket 60 lends rigidity to the structure since it is secured to plate 10 and plate 59 as shown.

Sliding member 40 which is used to actuate the coupling control device is meshed with gear 38A as previously described. Shorting bar 35 is replaced by connectors 35A which make connection between the shafts 33 and 34 and the bottom surface of plate 59. The connectors 35A are slit radially and spread outwardly into contact with plate 59, thereby making a short current path between arms 31 and 32. Meshed gears 37 and 38 are fixedly pinned to shafts 33 and 34 respectively. Intermediate these gears and shortening connection 35A, arms 31 and 32 are mounted on the respective shafts and connected as described above to conductors 17 and 18 respectively.

It is seen that the rotation of gear 38A causes the opposite rotation of conductors 17 and 18 and consequently effects a change in the coupling to the transmission section with which it is associated by combining the two effects as described hereinbefore.

It is understood that the changing of these two effects may be effected in different manner, such as by locating the conductors 17 and 18 between the legs of the tank circuit and causing them to be rotated in the same direction, the radius of the arms 31 and 32 being small as compared to the distance between shafts 33 and 34.

The end view of the embodiment shown in Figs. 5 and 6 is shown in Fig. 7. Block 46 is pivotally mounted by bolt or screw 47 and wheel 50 secured in that block urges sliding bar 40 into continuous and substantially uniform engagement with drive gear 38A. The pressure of wheel 50 against bar 40 and consequently the extent of the engagement of that bar with gear 38A is controlled by regulating the tension of spring 45 connected to block 46 as previously described. Spring 45 bears against eccentric 61 adjustably mounted by screw 52. With eccentric 61 in the position shown, the tension in spring 45 is a minimum value. Eccentric 61 and screw 62 provide means for adjusting the tension in the spring to any desired value. This is accomplished by loosening screw 62 and rotating eccentric 61 until the desired tension is obtained and then tightening screw 62 to retain eccentric 61 in the new position.

Fig. 8 demonstrates the physical relationship between the two transmission line sections. The dotted drawing of arms 31 and 32 shows them closest to plate tank 53 which is the condition of maximum impedance and is their position as shown in Figs. 1 and 2. In the solid line position arms 31 and 32 are in touching engagement and the characteristic impedance is a minimum or substantially zero. This shows clearly that as the distance between conductors 17 and 18 increases their distance from plate tank 53 decreases until the position of maximum impedance is reached. The increase of the distance between the conductors increases the impedance and the decrease in the distance of those conductors from plate tank 53 increases the coefficient of coupling. The movement of conductors 17 and 18 through an arc thus simultaneously combines these two effects by a single movement of the conductors and results in a greater coupling change for the same movement of the conductors than would be accomplished by their movement in straight lines. It follows, therefore, that the adjustment of the coupling results in a substantial reduction of the space required.

Fig. 9 shows the arrangement of the invention in circuit diagram form. Plate tank circuit 53 is connected to the plates of the grid-controlled transmitter tubes 65 and 66. Variable capacitor 67 is provided to effect the tuning of plate tank circuit 53. The coupling loop comprising terminal strip 28, arm 20, conductor 18, arm 32, shorting bar 35, arm 31, conductor 17, arm 19, and terminal strip 27 conveys the transmitter output over conductors 68 and 69 to terminals 70 and 71, having split rotor capacitor 72 connected thereacross. The equal arcs 73 through which conductors 17 and 18 move during the adjustment of the coupling between the loop and plate tank 53 are shown in order that the relative distances between these conductors and from them to the plate tank will be clearly demonstrated for all positions throughout the coupling range.

While there has been here described preferred embodiments of the invention, various changes and modifications may be made therein without departing from the spirit of the invention or the scope of the appended claims.

We claim:
1. In electric coupling apparatus including a circuit, a coupling loop to be coupled with said circuit and disposed in spaced relation thereto, said loop having parallel conductors which are parallel to the conductors of said circuit and means for oppositely rotating said conductors through equal arcs of intersecting circles, said means including oppositely rotatable shafts, arms connecting said shafts to the ends of the conductors of one side of said loop, and means for rotating said shafts, whereby the coupling between said loop and said circuit may be varied from substantially zero to a maximum value.

2. In electric coupling apparatus including a circuit; a coupling loop having parallel conductors mounted in spaced relation to said circuit, a pair of shafts, a pair of arms one carried by each of said shafts, means connecting one each of said parallel conductors to one of said arms for movement therewith, and means to rotate simultaneously said shafts in opposite directions to vary the position of said conductors relative to each other and to said circuit.

3. Electrical coupling apparatus according to claim 2, wherein said coupling loop includes a plurality of parallel conductors for each side of the loop.

4. In electrical coupling apparatus including a circuit, a coupling loop having parallel conductors mounted in spaced coupled relation to said circuit, metallic arms secured to the ends of the conductors of the respective sides of the loop, a first rotatable shaft secured to an arm associated with a conductor of one side of said loop, a second rotatable shaft secured to an arm associated with a conductor of the other side of said loop, a mechanical coupling between said shafts to rotate them oppositely to one another, a driving member engageable with one of said shafts, a manually rotatable member engageable with said driving member, and means for holding said driving member in substantially uniform engagement with the shaft with which it is engageable.

5. Apparatus according to claim 4 wherein said means includes a wheel rideable in a groove of said driving member, a pivotally mounted block carrying said wheel, a resilient member mounted on said block and having an extended portion extending outward therefrom and a stationary member mounted to contact said extended portion.

6. Apparatus according to claim 4 wherein said means includes a wheel rideable in a groove of said driving member, a pivotally mounted block carrying said wheel, a resilient member mounted on said block and having an extended portion extending outward therefrom and a stationary member mounted to contact said extended portion whereby said driving member is held substantially uniformly against said driven member of said shaft.

7. In electrical coupling apparatus, a first shaft mechanically coupled to a manual control, a second shaft mechanically coupled to said first shaft, a metallic arm on each of said shafts and rotatable therewith, a radio frequency conductor fixedly connected to each of said arms in spaced relation to the shaft connected thereto, a second metallic arm connected to each of said conductors, a third shaft connected to one of said second arms and a fourth shaft connected to the other of said second arms, and said third and fourth shafts being mounted respectively on the same centerline as said first and second shafts.

8. In electrical coupling apparatus, a first shaft mechanically coupled to a manual control, a second shaft mechanically coupled to said first shaft, a metallic arm on each of said shafts and rotatable therewith, a metallic bar interconnecting said shafts, a radio frequency conductor fixedly connected to each of said arms in spaced relation to the shaft connected thereto, a second metallic arm connected to each of said conductors, a third shaft connected to one of said second arms, a fourth shaft connected to the other of said arms, and a plate tank circuit located in spaced relationship to the radio frequency conductors.

9. In electrical coupling apparatus, a first shaft and a metallic arm rotatable therewith, a second shaft and a metallic arm rotatable therewith, a gear fixedly mounted on said first shaft and engageable with a gear fixedly mounted on said second shaft, a third rotatable shaft and a fourth rotatable shaft each carrying a metallic arm rotatable therewith, said third and fourth shafts being respectively on the same center line as said first and third shafts, a radio frequency conductor joining the corresponding ones of said arms, a metallic bar connecting said first and second shafts, and a transmission line section to be coupled located in spaced relation to the conductors.

10. A variable inductance device including two elongated conductors arranged side by side and substantially parallel to each other, said conductors being connected together at one end to form an interrupted turn, and means for rotating at least one of said conductors about an axis eccentric to the axis of that conductor to vary the spacing between said conductors to vary the inductance value presented at the unconnected ends of said conductors.

11. A variable inductance device including two elongated conductors arranged side by side and substantially parallel to each other, said conductors being connected together at one end to form an interrupted turn, and at least one of said conductors being arranged on crank elements for rotatable movement about an axis eccentric to the axis of that conductor to vary the spacing between said conductors to vary the inductance value presented at the unconnected ends of said conductors.

12. A variable inductance device including two elongated conductors arranged side by side and substantially parallel to each other, said conductors being connected together at one end to form an interrupted turn, and means for rotating said conductors about axes eccentric to the axes of the respective conductors to vary the spacing between said conductors to vary the inductance value presented at the unconnected ends of said conductors.

13. A variable inductance device comprising two substantially parallel longitudinal conductors, said conductors being arranged for rotation and to constitute an interrupted turn, means for simultaneously varying the spacing between said pair of conductors, said means including a plurality of cranks, said conductors being individually mounted eccentrically on different cranks, said cranks being arranged to be rotated together in such a manner that upon rotation thereof the spacing between the individual conductors lying at the corners of an imaginary rectangle can be expanded or contracted.

References Cited in the file of this patent

UNITED STATES PATENTS

| Number | Name | Date |
|---|---|---|
| 2,142,630 | Conklin | Jan. 3, 1939 |
| 2,194,696 | Eickemeyer et al. | Mar. 26, 1940 |
| 2,312,827 | Lindeblad | Mar. 2, 1943 |
| 2,336,555 | Malling | Dec. 14, 1943 |
| 2,373,233 | Dow et al. | Apr. 10, 1945 |
| 2,391,917 | Newkirk | Jan. 1, 1946 |
| 2,397,543 | Fuchs | Apr. 2, 1946 |
| 2,404,745 | Roberts | July 23, 1946 |
| 2,554,295 | Cooper | May 22, 1951 |